United States Patent [19]

Harada

[11] Patent Number: 5,544,418
[45] Date of Patent: Aug. 13, 1996

[54] BRANCH TRIMMER

[76] Inventor: Kazuo Harada, 3-10, Uragaoka 1-chome, Yokosuka-shi, Kanagawa, Japan

[21] Appl. No.: 453,159

[22] Filed: May 30, 1995

[30] Foreign Application Priority Data

May 31, 1994 [JP] Japan .................................. 6-118731

[51] Int. Cl.$^6$ ..................................................... B27B 3/00
[52] U.S. Cl. ................................................. 30/392; 30/210
[58] Field of Search .................................... 30/166.3, 392, 30/393, 394, 210, 216, 228

[56] References Cited

U.S. PATENT DOCUMENTS

| | | | |
|---|---|---|---|
| 3,193,925 | 7/1965 | Hawley | 30/210 |
| 3,212,188 | 10/1965 | Riley, Jr. et al. | 30/216 |
| 3,316,636 | 5/1967 | Raper, Jr. et al. | 30/210 |
| 3,422,531 | 1/1969 | Lill et al. | 30/210 |
| 3,657,813 | 4/1972 | Knight | 30/166.3 |

FOREIGN PATENT DOCUMENTS

| | | |
|---|---|---|
| 3213185 | 12/1986 | Germany . |
| 62-142238 | 9/1987 | Japan . |
| 6-64433 | 9/1994 | Japan . |

*Primary Examiner*—Hwei-Siu Payer
*Attorney, Agent, or Firm*—Armstrong, Westerman, Hattori, McLeland & Naughton

[57] ABSTRACT

A branch trimmer comprises a momentum converter for converting rotary motion of the output of a power source into linear reciprocation; a saw blade being slidably reciprocated in a longitudinal direction thereof under the application of power transmitted from the momentum converter; a gear case body for accommodating a base portion of the saw blade and the momentum converter; and a gear case cover for covering a bottom portion of the gear case body. The gear case cover is divided into plural parts, a first divided gear case cover part is formed such that the outline thereof is a slightly larger than the outline of the base portion of the saw blade disposed in the gear case body when the saw blade is maximally extended to its top dead center position thereof.

6 Claims, 3 Drawing Sheets

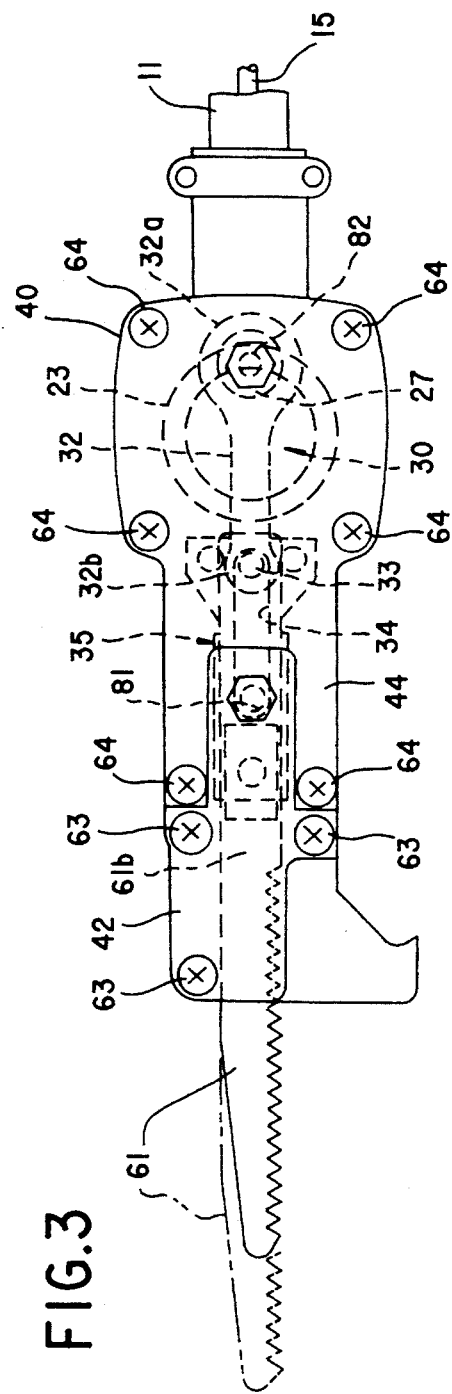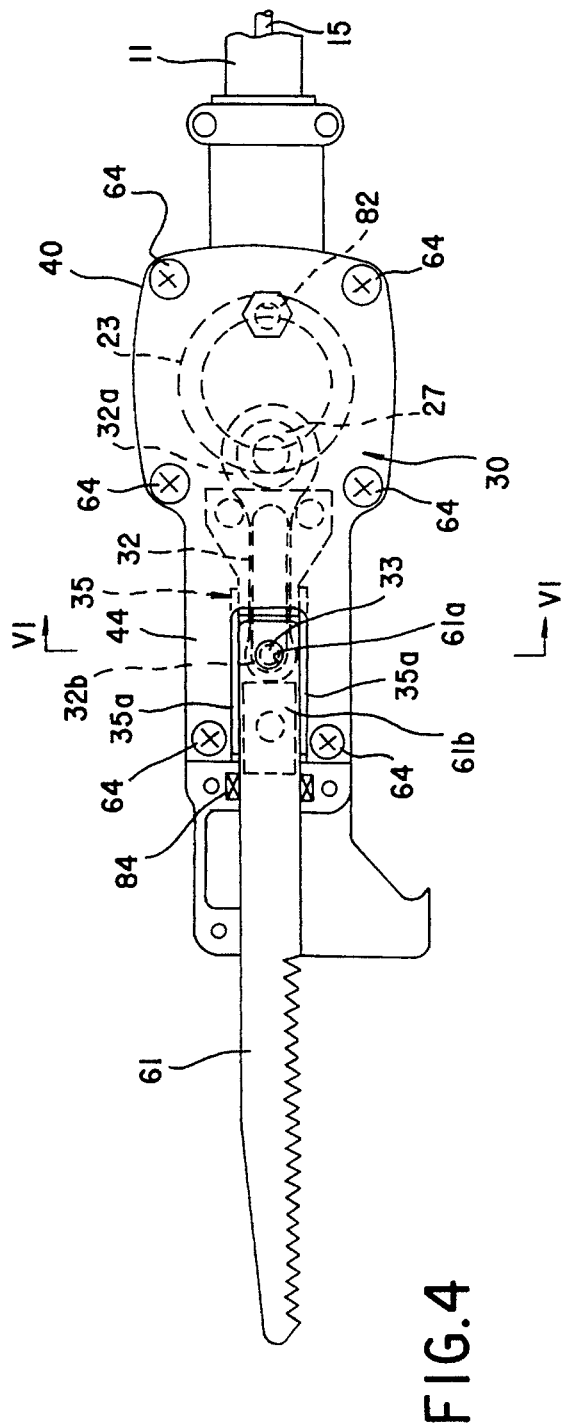

BRANCH TRIMMER

BACKGROUND OF THE INVENTION

The present invention relates to a branch trimmer and, more particularly, pertains to a new and improved branch trimmer for cutting branches of a tree, and the like, by reciprocating a saw blade thereof in a longitudinal direction.

In a conventional branch trimmer of this kind used for the cutting or trimming of branches, which may be located at an elevated position, such as for example, high branches on roadside or garden trees, an output of rotational power from a power source, such as a small two-cycle gasoline engine, mounted on an operation sleeve at the base end thereof, is transmitted to a reciprocating saw blade attached to the other end of the operation sleeve, which, in turn, is capable of cutting the branches by abutting the saw blade against them.

The assignee of the present invention have proposed a branch trimmer, as disclosed in Japanese Examined Utility Model Publication No. Hei 4-23395, wherein a momentum converter converting rotary motion of the output of the power source into linear reciprocation is mounted on the operation sleeve at the end thereof on the side of the saw blade, in which the power source and the momentum converter are connected by a rotation shaft disposed within a telescopic operation sleeve.

Such a branch trimmer comprises four guide rollers having grooves for slidably reciprocating the saw blade while regulating the both sides thereof, wherein the saw blade and whole the bottom portion of the gear case are covered with an integrally formed gear case cover. In the former prior art, as described above, when a replacement of the saw blade is required, the gear case must be removed in order to open the entire momentum converter, then the tip of a driver tool is inserted between the saw blade and a small end of a connecting rod and the driver tool is forcibly pulled down so that a pin on the small end of the connecting rod can be removed from the pin fitting bore. However, this kind of prior art apparatus has problems in that replacement of the saw blade requires very troublesome work. Moreover, the gear case is susceptible to receipt of foreign substances, such as dust, because the entire bottom portion of the gear case must be opened when replacing the saw blade. Thus, in such apparatus, the durability of the momentum converter device, and the like, is jeopardized and the need to disassemble the apparatus may cause loss of parts.

SUMMARY OF THE INVENTION

The present invention solves the above problems, which are inherent in known types of prior art apparatus. It is, thus, an object of the present invention to provide a branch trimmer which can facilitate replacement of the saw blades while preventing the loss of parts as a result of the saw blade exchange work.

Another object of the present invention is to provide a branch trimmer which can prevent dust, and the like, from intruding into the gear case.

Still another object of the present invention is to provide a branch trimmer wherein the saw blade can be slidably reciprocated smoothly and the construction, as a whole, can be of low cost and simplified.

To attain the foregoing objects, a branch trimmer, according to one preferred mode of the present invention, comprises a momentum converter for converting rotary motion of the output of the power source into linear reciprocation; a saw blade being slidably reciprocated in a longitudinal direction thereof under the application of power transmitted from the momentum converter; a gear case body for accommodating a base portion of the saw blade and the momentum converter; and a gear case cover for covering a bottom portion of the gear case body, wherein the gear case cover is divided into plural parts, with one part, whose peripheral extent is slightly greater than the saw blade and which overlies the saw blade when it is disposed in the gear case body and maximally extended to its top dead center position, a first divided part being formed such that its peripheral extent is slightly larger than that of the base portion of the saw blade attached to the gear case body, when the saw blade is maximally drawn to its top dead center.

More preferably, in a more specific aspect of the invention, the gear case body comprises a cutter guide mounted therein and having a generally inverse U-shaped cross section, for guiding the base portion of the saw blade, the cutter guide further comprising a slot for allowing a pin, connecting the saw blade to the momentum converter, to slidably reciprocate therethrough. In addition, according to another specific aspect of the invention, the gear case cover includes a bore which receives a tool, such as a driver, operable to shift the saw blade from its bottom dead center position, and wherein the bore can also serve as a grease supply opening.

According to the branch trimmer of the present invention, when the saw blade is to be replaced, only the described one part of the gear case cover is removed and the tip portion of the saw blade is drawn frontward to its top dead center position so that the entire base portion of the saw blade can be exposed simply by opening a minimum portion of the gear case, thereby reducing the possibility of a foreign substance, such as dust, from intruding into the gear case as well as facilitating the saw blade replacement procedure.

Further, when the saw blade should be stopped at the bottom dead center position thereof, it can be easily drawn therefrom by inserting the tool through the grease supply opening and shifting the position of the saw blade.

Furthermore, the saw blade can smoothly reciprocate in the cutter guide.

BRIEF DESCRIPTION OF THE DRAWINGS

The instant invention will be more fully described and better understood from the following description, taken with the appended drawings, in which.

FIG. 3 is a bottom view of the branch trimmer as viewed in arrow III in FIG. 2;

FIG. 4 is a bottom view of the branch trimmer wherein the saw blade is drawn from the position shown in FIG. 3 to its top dead center position and a part of the gear case cover is removed;

DETAILED DESCRIPTION OF THE PREFERRED EMBODIMENT

A preferred embodiment of the present invention will now be described, in detail, with reference to the accompanying drawings.

Figure 1:
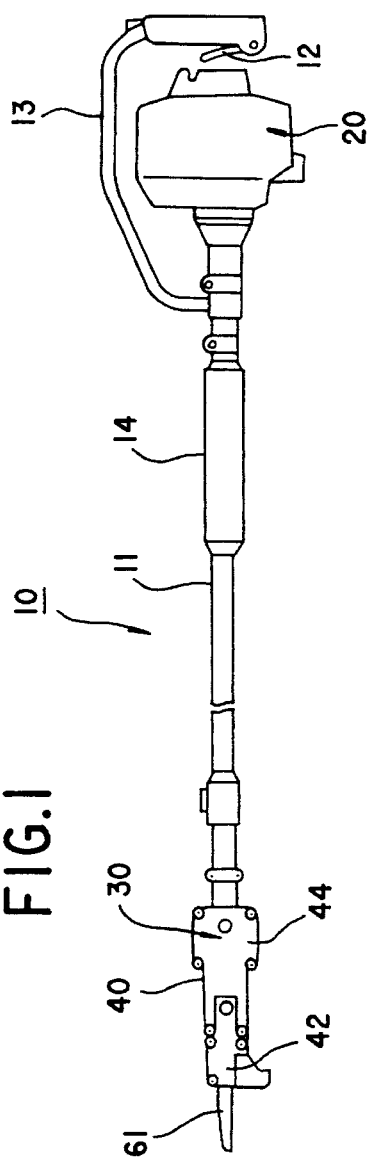
FIG. 1 is a schematic front view of an embodiment of the branch trimmer according to the present invention.

FIG. 1 shows a schematic front view of an embodiment of the branch trimmer according to the present invention.

As shown in FIG. 1, a branch trimmer 10 comprises a power source 20, such as a small two-cycle gasoline engine, mounted on an operation sleeve 11 at the base end thereof, wherein an output of rotational driving power from the power source 20 is transmitted to a momentum converter 30, disposed in a gear case body 40 which is mounted on the operation sleeve 11 at the other end (tip end portion) thereof, through a power transmission shaft 15 (described later) disposed in the operation sleeve 11. As described in detail hereinbelow, the rotational momentum of the power source 20 is converted into linear reciprocation by the momentum converter 30, which in turn is transmitted to a reciprocating saw blade 61 connected to the tip portion of the momentum converter 30. In FIG. 1, a throttle lever 12 is mounted on an end portion of a handle 13 and a grip 14 is attached on a peripheral surface of the operation sleeve 11.

Next, construction of the tip end portion of the branch trimmer will now be described in detail.

Figure 2:
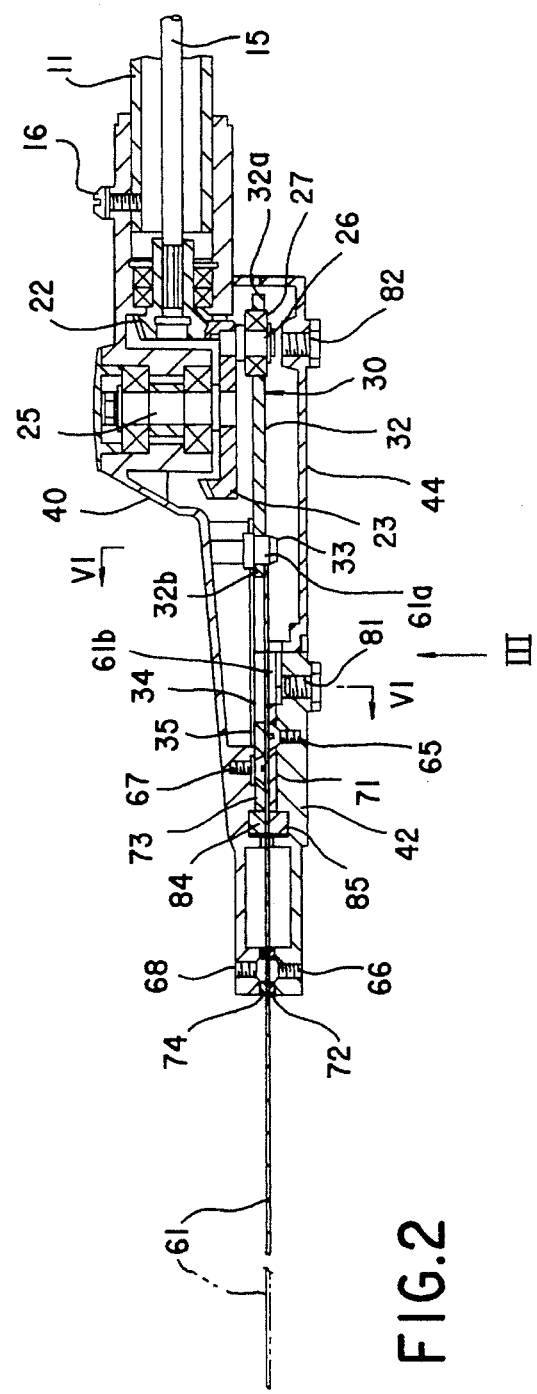
FIG. 2 is an enlarged fragmentary cross sectional view of the branch trimmer shown in FIG. 1.
Figure 5:
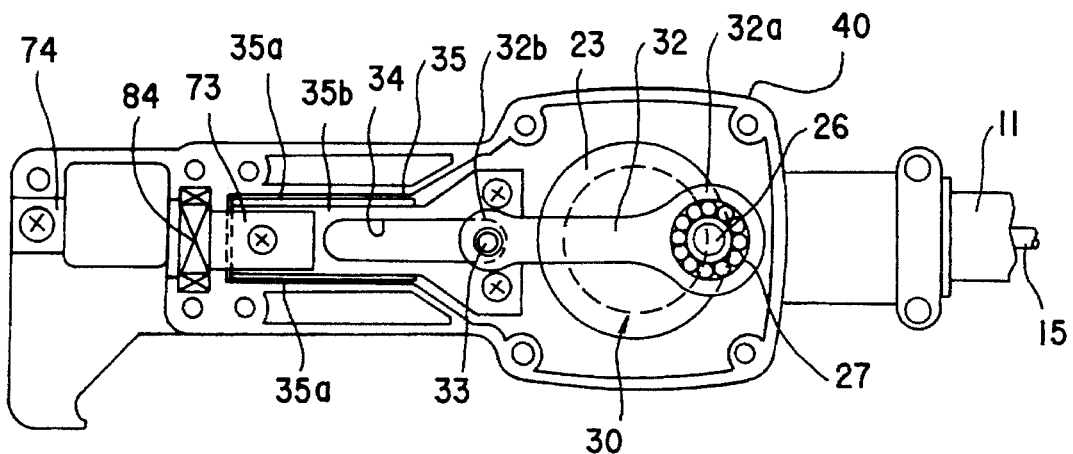
FIG. 5 is a bottom view of the branch trimmer similar to FIG. 4 wherein a second part of the gear case cover and the saw blade are removed from the trimmer.

FIG. 2 is an enlarged fragmentary cross sectional view of the branch trimmer shown in FIG. 1; FIG. 3 is a bottom view of the branch trimmer as viewed in arrow III in FIG. 2; FIG. 4 is a bottom view of the branch trimmer wherein the saw blade is displaced from the position shown in FIG. 3 to the top dead center position and the one part of the gear case cover is removed; FIG. 5 is a bottom view of the branch trimmer similar to FIG. 4 wherein a second part of the gear case cover and the saw blade are removed from the trimmer; and FIG. 6 is an enlarged cross sectional view of the branch trimmer taken along line VI—VI of FIG. 4 with the saw blade removed therefrom.

Like a conventional trimmer, the gear case body 40 is mounted on the tip portion of the operation sleeve 11 by means of a setscrew 16, or the like. As shown in FIG. 2, the interior of the gear case body 40 contains a driving bevel gear 22 with a small radius connected, by means of a spline, to the power transmission shaft 15 that is disposed in the operation sleeve 11 at the tip end portion thereof; a driven bevel gear 23 having a large radius being disposed perpendicular to the driving bevel gear 22 and engaged thereto; a main shaft 25 coaxially disposed with the driven bevel gear 23; a crankpin 26 mounted on the driven bevel gear 23 at the peripheral end portion thereof; a connecting rod 32 for converting rotational momentum into linear reciprocation wherein a large end 32a thereof is rotatably connected to the crankpin 26 through a bearing 27; and a cutter guide 35 having a slot 34 for allowing one end portion (an upper end as viewed in FIG. 2) of a pin 33, fixed to a small end 32b of the connecting rod 32, to slidably reciprocate therethrough. Further, the saw blade 61 is connected to the small end 32b of the connecting rod 32 by fitting the other end portion (a lower end as viewed in FIG. 2) of the pin 33 into a mount bore 61a of the saw blade 61.

On the other side (lower side) of the gear case body 40 with respect to the saw blade 61, are mounted a first gear case cover part 42 and a second gear case cover part 44, respectively, to the bottom portion of the gear case body 40 by means of plural setscrews 63 and 64. As will be apparent from FIG. 3 and FIG. 4, the first gear case cover part 42 is formed such that at least the entire central portion and the base portion 61b of the saw blade 61 can be exposed when the saw blade 61 is at its top dead center position (as shown in phantom lines of FIG. 3 and solid lines of FIG. 4). As shown, the first gear case cover part 42 includes a protruding rear end portion extending backwardly and being of a peripheral extent to cover the outer periphery of the base portion 61b of the saw blade 61. The second gear case cover part 44 includes a recess portion part cut out from the bottom surface of the gear case body 40 at its forward end and having an outline formed such that the first gear case cover part 42 can be snugly received therein.

Figure 6:
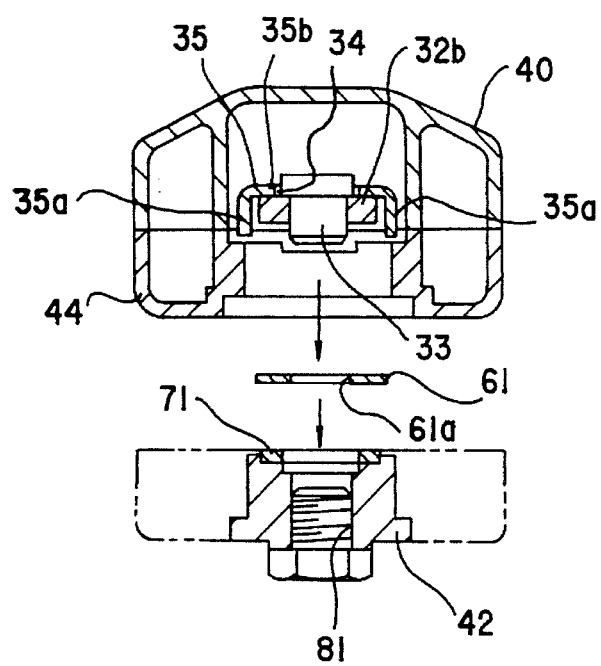
FIG. 6 is an enlarged cross sectional view of the branch trimmer taken along line VI—VI of FIG. 4 with the saw blade removed therefrom.

As shown in FIG. 6, a cutter guide 35 includes right and left upstanding wall portions 35a, 35a and an upper wall portion 35b, elongated in a longitudinal direction, to form in section, an inverted U-shaped metal fitting effective to prevent the saw blade 61 from sliding sideways and smoothly guiding it within the cutter guide 35 by means of the pin 33 reciprocating along a slot 34 formed on the upper wall portion 35b of the cutter guide 35. Further, as shown in FIG. 2 and FIG. 6, the saw blade 61 is sandwiched between spacer 71, 72, which are fixed to the first gear case cover part 42 by setscrews 65, 66, and spacers 73, 74, which are fixed to the gear case body 40 by setscrews 67, 68, thereby enabling the saw blade 61 to smoothly slide.

The first gear case cover part 42 contains a first grease supply opening 81 disposed at the location corresponding to the top dead center position of the small end 32b (pin 33) of the connecting rod 32, while the second gear case cover part 44 includes a second grease supply opening 82 disposed at the location corresponding to the bottom dead center position of the large end 32a (crankpin 26) of the connecting rod 32. The second grease supply opening 82 is utilized for displacing the saw blade 61 forwardly toward its top dead center position when the connecting rod 32 is stopped at the bottom dead center position wherein the saw blade 61 is prevented from being drawn forwardly; that is, the saw blade 61 can be moved slightly from the bottom dead center position by using a stick-like tool such as a screw driver, inserted through the second grease supply opening 82, and thereby enabling the saw blade 61 to be easily displaced from the bottom dead center position toward the top dead center position. In FIG. 2, dust-proof seals 84, 85, respectively are shown mounted on the gear case body 40 and the first gear case cover part 42.

Next, the operation of the branch trimmer 10 according to the disclosed embodiment of the present invention will be described.

The output driving power of the power source 20 is transmitted through the power transmission shaft 15 disposed within the operation sleeve 11, the pair of driving and driven bevel gears 22, 23 disposed in the gear case body 40, and the connecting rod 32, to the saw blade 61, which in turn is reciprocated.

When the saw blade 61 is to be replaced, the first gear case cover part 42 is removed by removing the setscrews 63. Then, the tip end portion of the saw blade 61 is drawn forwardly to the top dead center position so that the base portion 61b of the saw blade 61 can be completely exposed to the exterior, thereby enabling the installed saw blade 61 to be removed and a new saw blade 61 installed. As mentioned above, when the saw blade 61 is stopped at the bottom dead center position of the connection rod 32, a slight displacement of the saw blade 61 using a stick-like tool inserted through the second grease supply opening 82 enables the saw blade 61 to be easily exchanged.

Further, when maintenance work, such as inspection or repair, is required, the second gear case cover part 44 can be removed by removing the setscrews 64.

According to the present invention constructed as described above, because the gear case cover is divided into plural parts, in which the first gear case cover part 42 is formed such that the outline thereof is slightly larger than that of the base portion 61b of the saw blade 61, disposed in the gear case body 40 with the saw blade 61 maximally drawn to its top dead center position, the saw blade 61 can be replaced simply by removing at least the first gear case cover part 42. Since the first gear case cover part 42 is of minimum size the danger of intrusion of dust, and the like, during the saw blade exchange work is reduced. Further, because the cutter guide 35 is formed to have a generally inverted U-shaped section, the saw blade 61 can be easily separated from the gear case body 40 by simply removing the first gear case cover part 42, thereby facilitating the saw blade replacement procedure. Furthermore, because the branch trimmer of the present invention is constructed in such a manner that the saw blade 61 can be easily replaced, materials and shapes of the saw blade 61 can be widely selected according to various operational conditions, thereby improving performance and durability of the branch trimmer.

Still further, the operation sleeve 11 may be telescopically constructed so that the length thereof can be extended to correspond to the elevation of the branch to be cut.

As hereinbefore explained, the present invention provides a branch trimmer which can facilitate replacement of the saw blades while preventing loss of parts during saw blade replacement procedure and prevent dust, and the like, from intruding into the gear case. Further, the saw blade can be slidably reciprocated smoothly and the construction, as a whole, is at low cost and simplified.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A branch trimmer, comprising:
    a momentum converter for converting rotary motion of the output of a power source into linear reciprocation;
    a saw blade mounted for slidable reciprocation in a longitudinal direction thereof under the application of power transmitted from said momentum converter;
    a gear case body for accommodating said saw blade and the momentum converter; and
    a gear case cover for covering a bottom portion of said gear case body to keep out debris harmful to gears in said gear case body, wherein said gear case cover is divided into a plurality of parts to facilitate blade removal and replacement, a first part of which is formed such that the outline thereof is slightly larger than the outline of said saw blade disposed in said gear case body, when said saw blade is extended to its maximum position and at least one other part that encloses the gears such that said first part may be removed to replace the saw blade without exposing any gears.

2. A branch trimmer as recited in claim 1 wherein said gear case body comprises cutter guide mounted therein, said cutter guide having a generally inverted U-shaped cross section for guiding the reciprocating movement of the saw blade.

3. A branch trimmer as recited in claim 1 including independent connector means attaching each of said gear case cover parts to said gear case body.

4. A branch trimmer, comprising:
    a momentum converter for converting rotary motion of the output of a power source into linear reciprocation;
    a saw blade mounted for slidable reciprocation in a longitudinal direction thereof under the application of power transmitted from said momentum converter;
    a gear case body for accommodating said saw blade and the momentum converter; and
    a gear case cover for covering a bottom portion of said gear case body, wherein said gear case cover is divided into a plurality of parts, a first part of which is formed such that the outline thereof is slightly larger than the outline of said saw blade disposed in said gear case body, when said saw blade is extended to its maximum position,
    wherein said gear case body comprises a cutter guide mounted therein, said cutter guide having a generally inverted U-shaped cross section for guiding the movement of the saw blade, and wherein said cutter guide comprises a slot operative to allow a pin connecting said saw blade to the momentum converter to slidably reciprocate therethrough.

5. A branch trimmer, comprising:
    a momentum converter for converting rotary motion of the output of a power source into linear reciprocation;
    a saw blade mounted for slidable reciprocation in a longitudinal direction thereof under the application of power transmitted from said momentum converter;
    a gear case body for accommodating said saw blade and the momentum converter; and
    a gear case cover for covering a bottom portion of said gear case body, wherein said gear case cover is divided into a plurality of parts, a first part of which is formed such that the outline thereof is slightly larger than the outline of said saw blade disposed in said gear case body, when said saw blade is extended to its maximum position,
    wherein said gear case cover further comprises a bore as a grease supply opening and operative to allow a tool to be inserted thereinto to engage said momentum converter so that said saw blade can be shifted from the maximally extended position thereof by using said tool.

6. A branch trimmer, comprising:
    a momentum converter for converting rotary motion of the output of a power source into linear reciprocation;
    a saw blade mounted for slidable reciprocation in a longitudinal direction thereof under the application of power transmitted from said momentum converter;
    a gear case body for accommodating said saw blade and the momentum converter; and
    a gear case cover for covering a bottom portion of said gear case body, wherein said gear case cover is divided into a plurality of parts, a first part of which is formed such that the outline thereof is slightly larger than the outline of said saw blade disposed in said gear case body, when said saw blade is extended to its maximum position,
    wherein said gear case cover parts include a second part having a recess formed in overlying relation to said saw blade when said saw blade is in its maximally extended position, and said first part contains a projecting portion received in said recess.

* * * * *